(12) United States Patent
Lu et al.

(10) Patent No.: US 12,427,912 B2
(45) Date of Patent: Sep. 30, 2025

(54) ELECTRONIC DEVICE AND OPTICAL MODULE THEREOF

(71) Applicant: Wistron NeWeb Corp., Hsinchu (TW)

(72) Inventors: Wei-Hao Lu, Hsinchu (TW);
Wei-Hung Liao, Hsinchu (TW);
Hsin-Fu Wang, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 142 days.

(21) Appl. No.: 18/435,021

(22) Filed: Feb. 7, 2024

(65) Prior Publication Data

US 2024/0300405 A1 Sep. 12, 2024

(30) Foreign Application Priority Data

Mar. 8, 2023 (TW) .................................. 112108511

(51) Int. Cl.
| | | |
|---|---|---|
| *F21S 4/20* | (2016.01) | |
| *B60Q 1/24* | (2006.01) | |
| *B60R 11/04* | (2006.01) | |
| *F21S 41/24* | (2018.01) | |
| *F21Y 115/10* | (2016.01) | |
| *B60R 11/00* | (2006.01) | |

(52) U.S. Cl.
CPC .............. *B60Q 1/249* (2022.05); *B60R 11/04* (2013.01); *F21S 4/20* (2016.01); *B60R 2011/0005* (2013.01); *B60R 2300/10* (2013.01); *F21Y 2115/10* (2016.08)

(58) Field of Classification Search
None
See application file for complete search history.

(56) References Cited

U.S. PATENT DOCUMENTS

2010/0315833 A1* 12/2010 Holman .................... F21K 9/23
362/606
2012/0294037 A1* 11/2012 Holman ............... G02B 6/0061
362/628
2018/0259193 A1* 9/2018 Lee ......................... F21V 3/049

FOREIGN PATENT DOCUMENTS

TW            M512108 U      11/2015

* cited by examiner

*Primary Examiner* — Anh Q Tran
(74) *Attorney, Agent, or Firm* — McClure, Qualey & Rodack, LLP

(57) ABSTRACT

An electronic device including a first light source, a second light source, and a light guiding element is provided. The first light source provides a first light. The second light source provides a second light. The light guiding element includes a first microstructure, a second microstructure, and a light emitting surface. The first microstructure faces the first light source. The second microstructure faces the second light source. The first microstructure includes a plurality of first grooves. The first light enters the light guiding element through the first grooves, and exits the light guiding element via the light emitting surface. The second microstructure includes a plurality of second grooves. The second light enters the light guiding element through the second grooves, and exits the light guiding element via the light emitting surface.

19 Claims, 6 Drawing Sheets

ELECTRONIC DEVICE AND OPTICAL MODULE THEREOF

CROSS REFERENCE TO RELATED APPLICATIONS

This application claims the benefit of priority to Taiwan Patent Application No. 112108511, filed on Mar. 8, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

BACKGROUND OF THE INVENTION

Field of the Invention

The present disclosure relates to an electronic device, in particular to an electronic device having an optical module.

Description of the Related Art

In conventional electronic devices (e.g., dash cams), images are captured by a lens, and an LED light source is configured to provide supplementary lighting to improve image capture quality at night. However, the light provided by the LED light source is often constrained by the light guiding element, resulting in problems of narrow emission angle or nonuniform illumination (with bright or dark regions) . . . etc., so that the effect of supplementary lighting is poor.

BRIEF SUMMARY OF THE INVENTION

In order to solve the above-mentioned problems, one of the technical aspects adopted by the present disclosure is to provide an electronic device including a first light source, a second light source, and a light guiding element. The first light source provides a first light. The second light source provides a second light. The light guiding element includes a first microstructure, a second microstructure, and a light emitting surface. The first microstructure faces the first light source. The second microstructure faces the second light source. The first microstructure includes a plurality of first grooves. The first light enters the light guiding element through the first grooves, and exits the light guiding element via the light emitting surface. The second microstructure includes a plurality of second grooves. The second light enters the light guiding element through the second grooves, and exits the light guiding element via the light emitting surface. The first grooves are parallel to each other and extend along a first direction. The second grooves are parallel to each other and extend along a second direction. The first direction is different from the second direction.

In one embodiment, the electronic device further includes a third light source. The third light source provides a third light. The light guiding element further includes a third microstructure. The third microstructure faces the third light source. The third microstructure includes a plurality of third grooves. The third light source enters the light guiding element through the third grooves. The third grooves are parallel to each other and extend along the first direction. The second microstructure is between the first microstructure and the third microstructure.

In one embodiment, the first direction is perpendicular to the second direction.

In one embodiment, the first microstructure, the second microstructure, and the third microstructure are arranged along a straight line. The first direction is parallel to the straight line.

In an embodiment, the electronic device further includes a fourth light source. The fourth light source provides a fourth light. The light guiding element further includes a fourth microstructure. The fourth microstructure faces the fourth light source. The fourth microstructure comprises a plurality of fourth grooves. The fourth light enters the light guiding element through the fourth grooves. The fourth grooves are parallel to each other and extend along the second direction. The fourth microstructure is between the second microstructure and the third microstructure.

In one embodiment, the first microstructure, the second microstructure, and the third microstructure are arranged along a straight line. An included angle is between the first direction and the straight line, and the included angle is 45 degrees.

In one embodiment, the electronic device further includes a fourth light source. The fourth light source provides a fourth light. The light guiding element further includes a fourth microstructure. The fourth microstructure faces the fourth light source. The fourth microstructure includes a plurality of fourth grooves. The fourth light enters the light guiding element through the fourth grooves. The fourth grooves are parallel to each other and extend along the second direction. The third microstructure is between the second microstructure and the fourth microstructure.

In one embodiment, a cross section of each of the first grooves is V-shaped. Each of the first grooves includes a first side surface and a second side surface. An included angle between the first side surface and the second side surface is between 60 degrees and 100 degrees.

In one embodiment, an interval between adjacent two of the first grooves is between 0.4 mm and 0.8 mm, and a depth of each of the first grooves is between 0.1 mm and 0.15 mm.

In one embodiment, the light guiding element further includes a first column, a second column, and a light guiding block. The first column is connected side by side with the second column. The first microstructure is formed on one end of the first column. Another end of the first column is connected to the light guiding block. The second microstructure is formed on one end of the second column. Another end of the second column is connected to the light guiding block. The light emitting surface is on the light guiding block. The first light enters the light guiding block through the first column, and exits the light guiding element via the light emitting surface, the second light enters the light guiding block through the second column, and exits the light guiding element via the light emitting surface.

In one embodiment, the electronic device further includes a device housing, a lens, and a circuit board. The first light source and the second light source are disposed on the circuit board. The device housing includes a first housing opening and a second housing opening. The light emitting surface of the light guiding element faces the first housing opening, and the lens faces the second housing opening.

In order to solve the above-mentioned problems, another one of the technical aspects adopted by the present disclosure is to provide an optical module including a first light source, a second light source, and a light guiding element. The first light source provides a first light. The second light source provides a second light. The light guiding element includes a first microstructure, a second microstructure, and a light emitting surface. The first microstructure faces the first light source. The second microstructure faces the second light source. The first microstructure includes a plurality of first grooves. The first light enters the light guiding element through the first grooves, and exits the light guiding element via the light emitting surface. The second microstructure includes a plurality of second grooves. The second light enters the second light guiding element through the second grooves, and exits the light guiding element via the emitting surface. The first grooves are parallel to each other and extend along a first direction. The second grooves are parallel to each other and extend along a second direction. The first direction is different from the second direction.

In the electronic device according to the embodiments of the present disclosure, the light guiding element has a first microstructure and a second microstructure. Since the light is modulated with the first microstructure and the second microstructure oriented in different groove directions, the emission angle of the light can be moderately increased, and the uniformity of the light emission can be improved, thereby obtaining a type of illumination field with relatively uniform illuminance.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
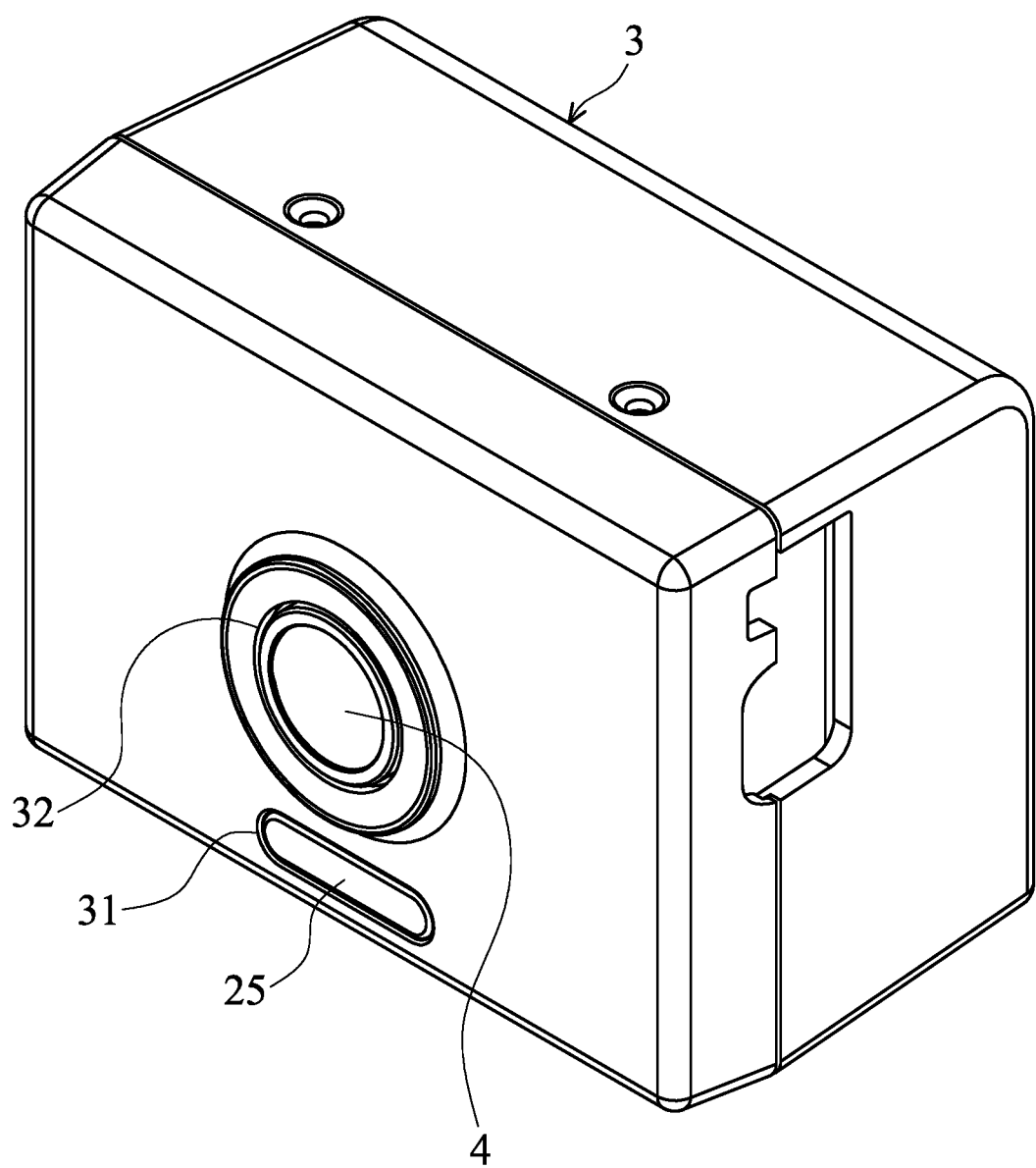
FIG. 1 is a schematic diagram of an electronic device according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Figure 2:
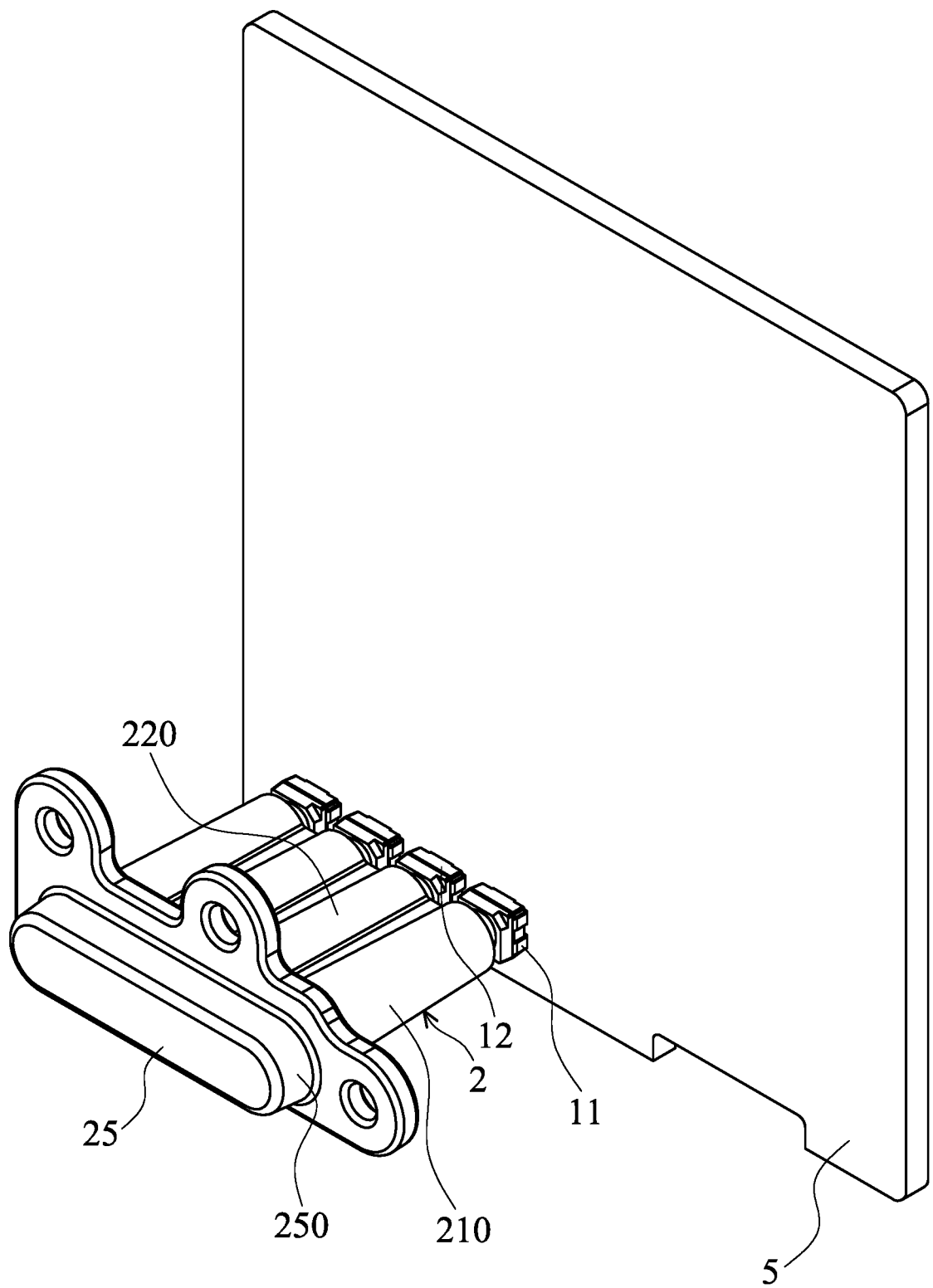
FIG. 2 is an optical module according to the embodiment of the present disclosure.
Figure 3:
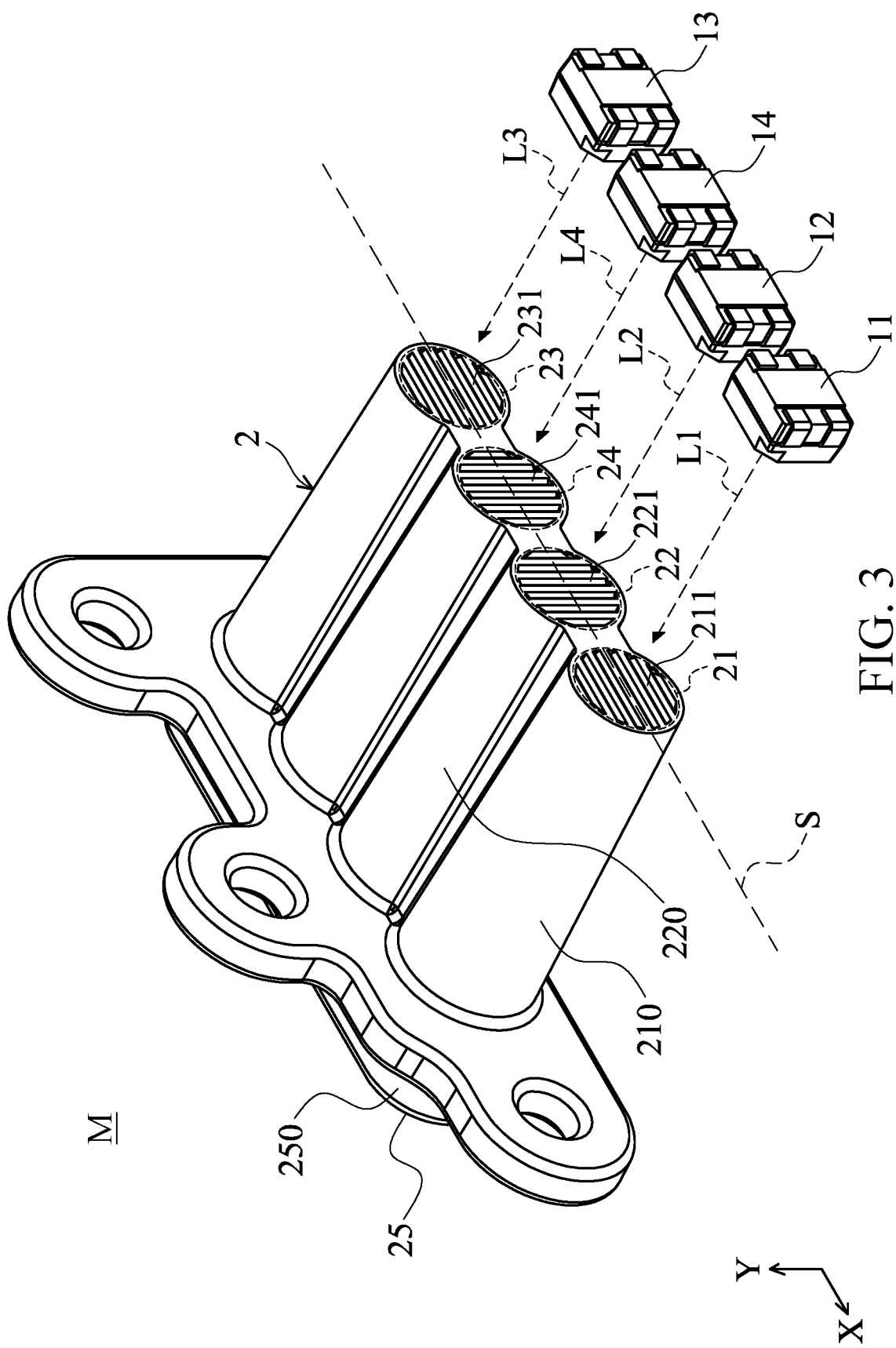
FIG. 3 is a detailed structure of a light guiding element according to the embodiment of the present disclosure.

FIG. 1 is a schematic diagram of an electronic device according to an embodiment of the present disclosure. FIG. 2 is an optical module according to the embodiment of the present disclosure. FIG. 3 is a detailed structure of a light guiding element according to the embodiment of the present disclosure. An electronic device E in the embodiment of the present disclosure includes a first light source 11, a second light source 12, and a light guiding element 2. The first light source 11 provides a first light L1. The second light source 12 provides a second light L2. The light guiding element 2 includes a first microstructure 21, a second microstructure 22, and a light emitting surface 25. The first microstructure 21 faces the first light source 11, and the second microstructure 22 faces the second light source 12. The first microstructure 21 includes a plurality of first grooves 211. The first light L1 enters the light guiding element 2 through the first grooves 211, and exits the light guiding element 2 via the light emitting surface 25. The second microstructure 22 includes a plurality of second grooves 221. The second light L2 enters the second light guiding element 2 through the second grooves 221, and exits the light guiding element 2 via the light emitting surface 25. The first grooves 211 are parallel to each other and extend along a first direction X. The second grooves 221 are parallel to each other and extend along a second direction Y. The first direction X is different from the second direction Y.

In one embodiment, the electronic device further includes a third light source 13. The third light source 13 provides a third light L3. The light guiding device 2 further includes a third microstructure 23. The third microstructure 23 faces the third light source 13. The third microstructure 23 includes a plurality of third grooves 231. The third light L3 enters the light guiding element 2 through the third grooves 231. The third grooves 231 are parallel to each other and extend along the first direction X. The second microstructure 22 is between the first microstructure 21 and the third microstructure 23.

In one embodiment, the first direction X is perpendicular to the second direction Y.

In one embodiment, the first microstructure 21, the second microstructure 22, and the third microstructure 23 are arranged along a straight line S. The first direction X is parallel to the straight line S.

In one embodiment of FIG. 3, the electronic device further includes a fourth light source 14. The fourth light source 14 provides a fourth light L4. The light guiding element 2 further includes a fourth microstructure 24. The fourth microstructure 24 faces the fourth light source 14. The fourth microstructure 24 includes a plurality of fourth grooves 241. The light L4 enters the light guiding element 2 through the fourth grooves 241. The fourth grooves 241 are parallel to each other and extend along the second direction Y. The fourth microstructure 24 is between the second microstructure 22 and the third microstructure 23.

Refer to FIG. 3, which uses the light guiding element 2 in the embodiment of the present disclosure. The second microstructure 22 and the fourth microstructure 24 disperse light provided by the second light source 12 and the fourth light source 14 in a direction perpendicular to the second direction Y. The first microstructure 21 and the third microstructure 23 disperse light provided by the first light source 11 and the third light source 13 in a direction perpendicular to the first direction X. In this way, a type of an illumination field with relatively uniform illuminance is obtained.

Figure 4:
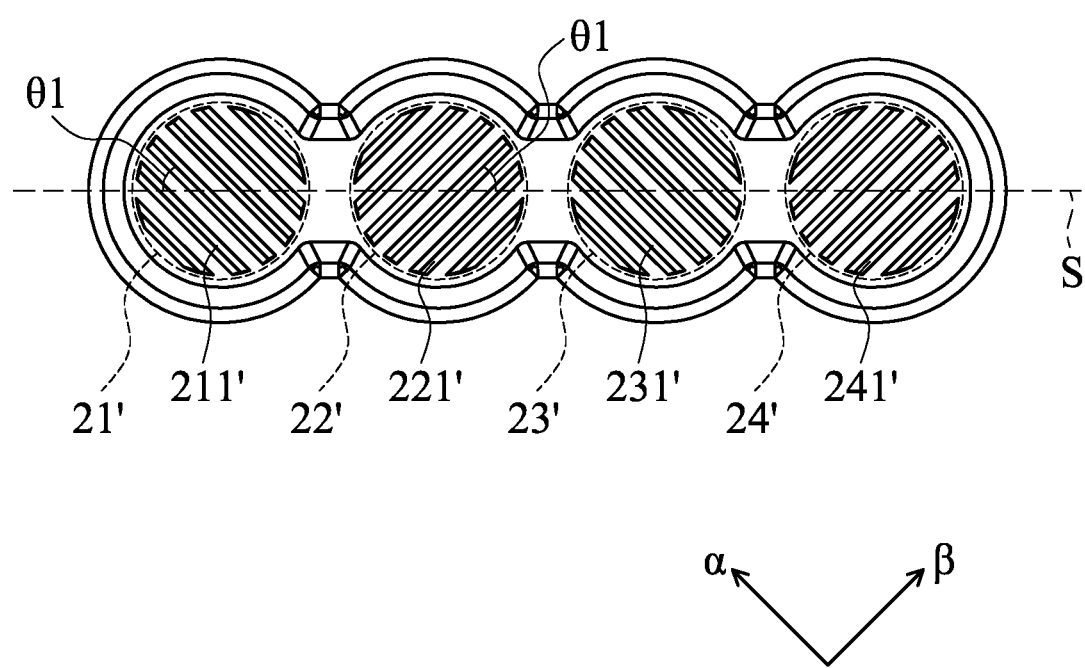
FIG. 4 is a schematic diagram of a light guiding element according to a second embodiment of the present disclosure.

FIG. 4 is a schematic diagram of a light guiding element according to a second embodiment of the present disclosure. In the embodiment of FIG. 4, the first microstructure 21', the second microstructure 22', and the third microstructure 23' are arranged along a straight line S. As in the previous embodiment, the first grooves 211' are parallel to each other and extend along a first direction α. The second grooves 221' are parallel to each other and extend along a second direction β. The third grooves 231' are parallel to each other and extend along the first direction α. The first direction α is different from the second direction β. In one embodiment, there is an included angle θ1 between the first direction α and the straight line S. The included angle θ1 is also between the second direction β and the straight line S. In one embodiment, the included angle θ1 is 45 degrees. In another embodiment, the first direction α is perpendicular to the second direction β. The above disclosure does not limit the present disclosure. For example, in another embodiment, the included angle θ1 may also be 30 degrees or 60 degrees.

In one embodiment, the light guiding element further includes a fourth microstructure 24'. The fourth microstructure 24' includes a plurality of fourth grooves 241'. The fourth grooves 241' are parallel to each other and extend along the second direction β. The third microstructure 23' is between the second microstructure 22' and the fourth microstructure 24'.

Referring to FIG. 4, which uses the light guiding element 2 in the second embodiment of the present disclosure. The first microstructure 21' and the third microstructure 23' disperse light provided by the first light source and the third light source in a direction perpendicular to the first direction α. The second microstructure 22' and the fourth microstructure 24' disperse light provided by the second light source and the fourth light source in a direction perpendicular to the second direction β. Therefore, a type of an illumination field with relatively uniform illuminance is obtained.

Figure 5A:
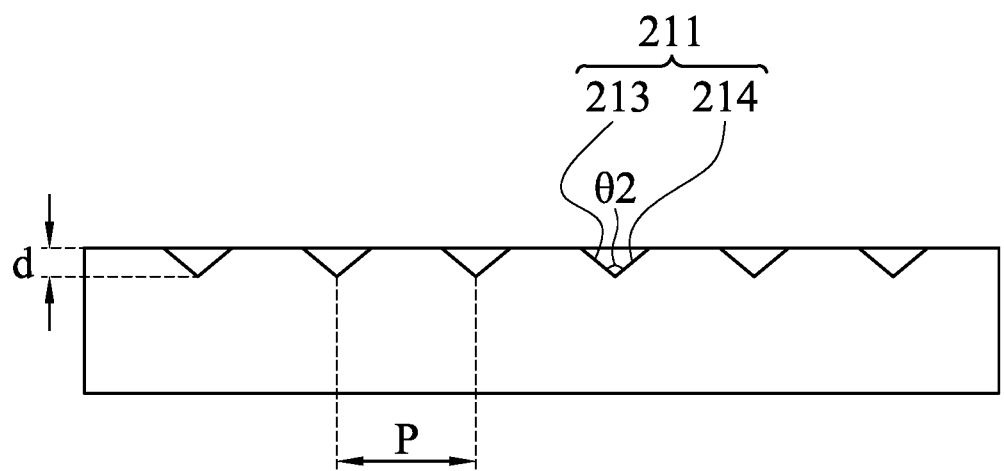
FIG. 5A is a cross section of grooves according to the embodiment of the present disclosure.

FIG. 5A is a cross section of grooves according to the embodiment of the present disclosure. In one embodiment of FIG. 5A, a cross section of each of the first grooves 211 is V-shaped. Each of the first grooves 211 includes a first side surface 213 and a second side surface 214, and an included angle θ2 between the first side surface 213 and the second side surface 214 is between 60 degrees and 100 degrees.

In one embodiment of FIG. 5A, an interval P between adjacent two of the first grooves 211 is between 0.4 mm and 0.8 mm. A depth d of each of the first grooves 211 is between 0.1 mm and 0.15 mm.

Figure 5B:
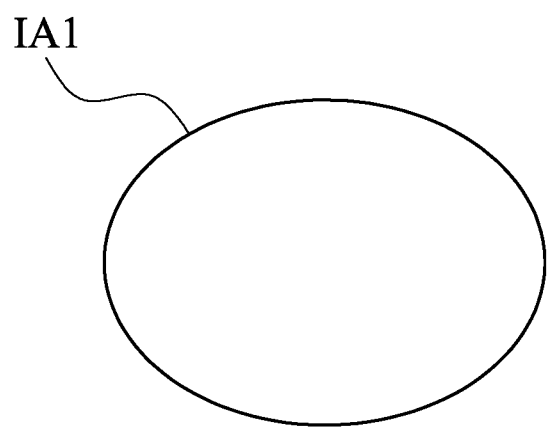
FIG. 5B is an illumination pattern affected by the microstructure of the embodiment shown in FIG. 5A of the present disclosure.

FIG. 5B is an illumination pattern affected by the microstructure of the embodiment shown in FIG. 5A of the present disclosure. By using the microstructure according to the embodiment of FIG. 5A of the present disclosure, an elliptical illumination pattern IA1 can be generated.

In the above embodiment, a cross section of the first grooves 211 is V-shaped. However, the above disclosure does not limit the present disclosure. The cross section of the first grooves 211 may also be U-shape or other shapes.

Figure 6A:
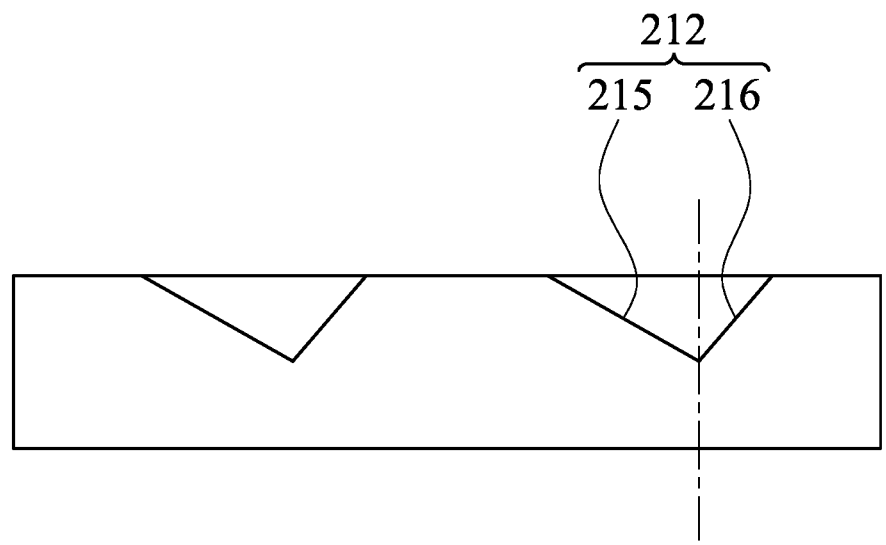
FIG. 6A is a cross section of grooves according to another embodiment of the present disclosure.
Figure 6B:
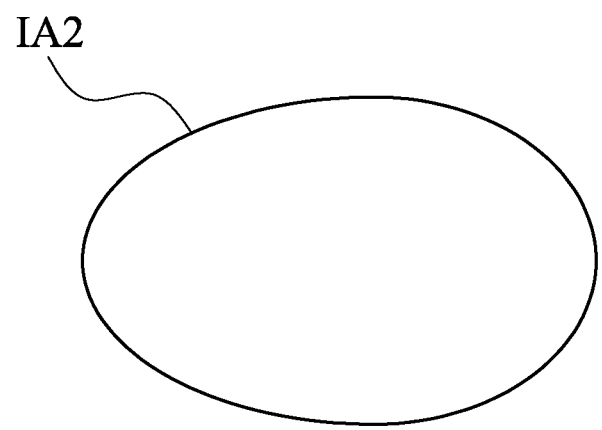
FIG. 6B is an illumination pattern affected by the microstructure of the embodiment shown in FIG. 6A of the present disclosure.

FIG. 6A is a cross section of grooves according to another embodiment of the present disclosure. In the embodiment of FIG. 6A, a cross section of each of the first grooves 212 is V-shaped. Each of the first grooves 212 includes a first side surface 215 and a second side surface 216. In the embodiment, the cross section of the first grooves 212 are asymmetric. FIG. 6B is an illumination pattern affected by the microstructure of the embodiments shown in FIG. 6A of the present disclosure. By using the microstructure according to the embodiment of FIG. 6A of the present disclosure, a relatively directional illumination pattern IA2 can be generated.

In one embodiment of FIGS. 2 and 3, the light guiding element 2 further includes a first column 210, a second column 220, and a light guiding block 250. The first column 210 is connected side by side with the second column 220. The first microstructure 21 is formed on one end of the first column 210. Another end of the first column 210 is connected to the light guiding block 250. The second microstructure 22 is formed on one end of the second column 220. Another end of the second column 220 is connected to the light guiding block 250. The light emitting surface 25 is on the light guiding block 250. The first light L1 enters the light guiding block 250 through the first column 210, and exits the light guiding element 2 via the light emitting surface 25. The second light L2 enters the light guiding block 250 through the second column 220, and exits the light guiding element 2 via the light emitting surface 25.

In one embodiment of FIGS. 1, 2 and 3, the electronic device E further includes a device housing 3, a lens 4, optical module M and a circuit board 5. The first light source 11 and the second light source 12 are disposed on the circuit board 5. The device housing 3 includes a first housing opening 31 and a second housing opening 32. The light emitting surface 25 of the light guiding element 2 faces the first housing opening 31. The lens 4 faces the second housing opening 32. In one embodiment, when the lens 4 captures an image, the optical module M provides a supplementary illumination for the lens 4.

In the electronic device according to the embodiments of the present disclosure, the light guiding element has a first microstructure and a second microstructure. Since the light is modulated with the first microstructure and the second microstructure oriented in different groove directions, the emission angle of the light can be moderately increased, and the uniformity of the light emission can be improved, thereby obtaining a type of illumination field with relatively uniform illuminance.

The foregoing description of the disclosure has been presented only for the purposes of illustration and description option of the exemplary embodiments and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An electronic device, comprising:
a first light surface providing a first light;
a second light surface providing a second light; and
a light guiding element comprising a first microstructure, a second microstructure, and a light emitting surface, wherein the first microstructure faces the first light source, the second microstructure faces the second light source, the first microstructure comprises a plurality of first grooves, the first light enters the light guiding element through the first grooves and exits the light guiding element via the light emitting surface, the second microstructure comprises a plurality of second grooves, the second light enters the light guiding element through the second grooves and exits the light guiding element via the light emitting surface;
wherein the first grooves are parallel to each other and extend along a first direction, the second grooves are parallel to each other and extend along a second direction, and the first direction is different from the second direction.

2. The electronic device according to claim 1, further comprising a third light source, wherein the third light source provides a third light, and the light guiding element further comprises a third microstructure, wherein the third microstructure faces the third light source, the third microstructure comprises a plurality of third grooves, the third light source enters the light guiding element through the third grooves, the third grooves are parallel to each other and extend along the first direction, and the second microstructure is between the first microstructure and the third microstructure.

3. The electronic device according to claim 2, wherein the first direction is perpendicular to the second direction.

4. The electronic device according to claim 3, wherein the first microstructure, the second microstructure, and the third microstructure are arranged along a straight line, and the first direction is parallel to the straight line.

5. The electronic device according to claim 4, further comprising a fourth light source, wherein the fourth light source provides a fourth light, and the light guiding element further comprises a fourth microstructure, wherein the fourth microstructure faces the fourth light source, the fourth microstructure comprises a plurality of fourth grooves, the fourth light enters the light guiding element through the fourth grooves, the fourth grooves are parallel to each other and extend along the second direction, and the fourth microstructure is between the second microstructure and the third microstructure.

6. The electronic device according to claim 2, wherein the first microstructure, the second microstructure, and the third microstructure are arranged along a straight line, an included angle is between the first direction and the straight line, and the included angle is 45 degrees.

7. The electronic device according to claim 6, further comprising a fourth light source, wherein the fourth light source provides a fourth light, and the light guiding element further comprises a fourth microstructure, wherein the fourth microstructure faces the fourth light source, the fourth microstructure comprises a plurality of fourth grooves, the fourth light enters the light guiding element through the fourth grooves, the fourth grooves are parallel to each other and extend along the second direction, and the third microstructure is between the second microstructure and the fourth microstructure.

8. The electronic device according to claim 1, wherein a cross section of each of the first grooves is V-shaped, each of the first grooves comprises a first side surface and a second side surface, and an included angle between the first side surface and the second side surface is between 60 degrees and 100 degrees.

9. The electronic device according to claim 8, wherein an interval between adjacent two of the first grooves is between 0.4 mm and 0.8 mm, and a depth of each of the first grooves is between 0.1 mm and 0.15 mm.

10. The electronic device according to claim 1, wherein the light guiding element further comprises a first column, a second column, and a light guiding block, the first column is connected side by side with the second column, the first microstructure is formed on one end of the first column, another end of the first column is connected to the light guiding block, the second microstructure is formed on one end of the second column, another end of the second column is connected to the light guiding block, the light emitting surface is on the light guiding block, the first light enters the light guiding block through the first column and exits the light guiding element via the light emitting surface, the second light enters the light guiding block through the second column and exits the light guiding element via the light emitting surface.

11. The electronic device according to claim 1, further comprising a device housing, a lens, and a circuit board, the first light source and the second light source being disposed on the circuit board, the device housing comprising a first housing opening and a second housing opening, the light emitting surface of the light guiding element facing the first housing opening, and the lens facing the second housing opening.

12. An optical module comprising:
a first light source providing a first light;
a second light source providing a second light; and
a light guiding element comprising a first microstructure, a second microstructure, and a light emitting surface, wherein the first microstructure faces the first light source, the second microstructure faces the second light source, the first microstructure comprises a plurality of first grooves, the first light enters the light guiding element through the first grooves and exits the light guiding element via the light emitting surface, the second microstructure comprises a plurality of second grooves, the second light enters the second light guiding element through the second grooves and exits the light guiding element via the emitting surface;
wherein the first grooves are parallel to each other and extend along a first direction, the second grooves are parallel to each other and extend along a second direction, and the first direction is different from the second direction.

13. The optical module according to claim 12, further comprising a third light source, wherein the third light source provides a third light, and the light guiding element further comprises a third microstructure, wherein the third microstructure faces the third light source, the third microstructure comprises a plurality of third grooves, the third light source enters the light guiding element through the third grooves, the third grooves are parallel to each other and extend along the first direction, and the second microstructure is between the first microstructure and the third microstructure.

14. The optical module according to claim 13, wherein the first direction is perpendicular to the second direction.

15. The optical module according to claim 14, wherein the first microstructure, the second microstructure, and the third microstructure are arranged along a straight line, and the first direction is parallel to the straight line.

16. The optical module according to claim 15, further comprising a fourth light source, wherein the fourth light source provides a fourth light, and the light guiding element further comprises a fourth microstructure, wherein the fourth microstructure faces the fourth light source, the fourth microstructure comprises a plurality of fourth grooves, the fourth light enters the light guiding element through the fourth grooves, the fourth grooves are parallel to each other and extend along the second direction, and the fourth microstructure is between the second microstructure and the third microstructure.

17. The optical module according to claim 13, wherein the first microstructure, the second microstructure, and the third microstructure are arranged along a straight line, an included angle is between the first direction and the straight line, and the included angle is 45 degrees.

18. The optical module according to claim 17, further comprising a fourth light source, wherein the fourth light source provides a fourth light, and the light guiding element further comprises a fourth microstructure, wherein the fourth microstructure faces the fourth light source, the fourth microstructure comprises a plurality of fourth grooves, the fourth light enters the light guiding element through the fourth grooves, the fourth grooves are parallel to each other and extend along the second direction, and the third microstructure is between the second microstructure and the fourth microstructure.

19. The optical module according to claim 12, wherein a cross section of each of the first grooves is V-shaped, each of the first grooves comprises a first side surface and a second side surface, and an included angle between the first side surface and the second side surface is between 60 degrees and 100 degrees.

* * * * *